(12) United States Patent
Han

(10) Patent No.: US 7,283,355 B2
(45) Date of Patent: Oct. 16, 2007

(54) PORTABLE COMPUTER

(75) Inventor: Jae-uk Han, Osan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 361 days.

(21) Appl. No.: 10/994,414

(22) Filed: Nov. 23, 2004

(65) Prior Publication Data

US 2005/0128695 A1    Jun. 16, 2005

(30) Foreign Application Priority Data

Dec. 10, 2003    (KR) .................. 10-2003-0089206

(51) Int. Cl.
*G06F 1/16*    (2006.01)
(52) U.S. Cl. .................. 361/683; 361/680; 248/917; 345/173
(58) Field of Classification Search ........ 361/680–683; 248/917, 923; 345/173
See application file for complete search history.

(56) References Cited

U.S. PATENT DOCUMENTS

| | | | |
|---|---|---|---|
| 5,255,214 A * | 10/1993 | Ma ........................ | 361/680 |
| 5,267,123 A * | 11/1993 | Boothroyd et al. ....... | 361/681 |
| 5,900,848 A * | 5/1999 | Haneda et al. ........... | 345/1.1 |
| 6,266,236 B1 * | 7/2001 | Ku et al. ................. | 361/681 |
| 6,384,811 B1 * | 5/2002 | Kung et al. .............. | 345/168 |
| 6,665,175 B1 * | 12/2003 | deBoer et al. ........... | 361/681 |
| 2005/0078444 A1 * | 4/2005 | Hong ...................... | 361/683 |
| 2005/0083644 A1 * | 4/2005 | Song ....................... | 361/683 |
| 2005/0105263 A1 * | 5/2005 | Tanaka et al. ........... | 361/683 |

FOREIGN PATENT DOCUMENTS

| | | |
|---|---|---|
| JP | 7-295680 | 11/1995 |
| KR | 10-0297746 | 8/2001 |
| KR | 20-316620 | 6/2003 |
| KR | 20-317129 | 6/2003 |

\* cited by examiner

*Primary Examiner*—Dean A. Reichard
*Assistant Examiner*—Xiaoliang Chen
(74) *Attorney, Agent, or Firm*—Roylance, Abrams, Berdo & Goodman, L.L.P.

(57) ABSTRACT

A portable computer comprising a main body, and a display part connected to the main body. The portable computer further comprises a pair of links connecting the display part with the main body; a display hinge provided between a first end of each link and the display part and pivotally supporting the display part to allow the display part to tilt relative to the pair of links; a main hinge provided between a second end of each link and the main body and pivotally supporting the pair of links to allow the pair of links to pivot relative to the main body; and a locking unit provided in the link and the display part to lock and release the tilt of the display part relative to the link member.

14 Claims, 14 Drawing Sheets

PORTABLE COMPUTER

CROSS-REFERENCE TO RELATED APPLICATIONS

This application claims priority from Korean Patent Application No. 2003-89206, filed on Dec. 10, 2003, in the Korean Intellectual Property Office, the disclosure of which is incorporated herein by reference.

BACKGROUND OF THE INVENTION

1. Field of the Invention:

The present invention relates to a portable computer. More particularly, the present invention relates to a portable computer having an improved structure to add convenience to a user's tablet operation.

2. Description of the Related Art:

Typically, a portable computer has to be easy to carry and handle. Portable computers include laptop computers, notebook computers, palmtop computers and the like, all of which are portable.

For example, a conventional portable computer, disclosed in U.S. patent application No. 6,005,757, comprises a main body mounted with a plurality of hardware components; a display part for displaying a picture based on a video signal received from the main body; and a pair of links provided between the main body and a lateral side of the display part. Further, between the display part and the link is provided a first hinge to allow the display part to tilt relative to the link. In addition, between the link and the main body is provided a second hinge to allow the link to pivot relative to the main body.

The display part utilizes touch-screen technology. The main body comprises a main board mounted with a central processing unit (CPU), a graphic chip, etc. inside, and an input unit such as a keyboard, a mouse, etc. outside.

With this configuration, in the conventional portable computer, the display part can be folded and opened relative to the main body, and pivoted about the second hinge. For example, if an angle is 0° when the display part is folded onto the main body, the display part can be opened at an angle of approximately 90° and can be turned upside down at an angle of 180° to be exposed upward. Further, the display part can tilt relative to the link, and pivot about the first hinge. Thus, the display part can tilt relative to the link member and the main body, so that a screen of the display part is exposed upward, thereby making a tablet operation possible.

In the conventional portable computer, the first and second hinges are provided to allow the display part to tilt relative to the main body, but it is inconvenient because there is no locking structure to maintain the display part and the main body in a fixed position.

Consequently, for convenience and a stablity of operation of the portable computer, it is desireable to improve the structure of the first and second hinges provided in the conventional portable computer.

SUMMARY OF THE INVENTION

Accordingly, it is an aspect of the present invention to provide a portable computer having an improved structure for convenience and stability when a display part is tilted.

Additional aspects and/or advantages of the invention will be set forth in the description which follows.

The foregoing aspects of the present invention are achieved by providing a portable computer comprising a main body, and a display part connected to the main body. The portable computer further comprises a pair of links connecting the display part with the main body; a display hinge provided between a first end of each link and the display part and pivotally supporting the display part to allow the display part to tilt relative to the pair of links; a main hinge provided between a second end of each link and the main body and pivotally supporting the pair of links to allow the pair of links to pivot relative to the main body; and a locking unit provided in the link and the display part to lock and release the tilt of the display part relative to the link member.

According to an aspect of the invention, the pair of links may be parallel to each other and disposed at opposite sides of the display part.

According to another aspect of the invention, the locking unit may comprise a locking projection protruding from one of the links and the display part toward the other link; and a projection holder provided in the other one and elastically locked to and released from the locking projection.

According to a further aspect of the invention, the locking projection may be provided in at least one of the pair of links, and the projection holder may be provided in the display part in correspondence to the locking projection.

According to yet another aspect of the invention, the projection holder may comprise a projection accommodating part formed in a lateral side of the display part to allow the display part tilted relative to the link to accommodate the locking projection; and a holding projection elastically retracted in the projection accommodating part by contacting the locking projection.

According to still another aspect of the invention, the projection accommodating part may comprise an opening in a back of the display part to accommodate the locking projection; and an elastic member facing opposite the opening and contacting the locking projection passed the holding projection so as to prevent noise from coming out.

According to an aspect of the invention, the locking projection may be placed adjacent to the second end of the link connected to the main hinge, and the pair of projection accommodating parts may be provided symmetrically with respect to an axis of the display hinge in correspondence to the locking projection, to selectively accommodate the locking projection.

According to another aspect of the invention, the projection holder may comprise a spring elastically pushing the holding projection outwardly from the display part, and the holding projection and the spring may be provided in at least one of the pair of projection accommodating parts.

According to still another aspect of the invention, the portable computer further comprises a coupler coupled to the main hinge and rotating relative to the main body integrally with the links, wherein an axis of the coupler may be aligned with an axis of the main hinge.

According to yet another aspect of the invention, the main hinge may comprise a second shaft member provided in the second end of each link, the coupler and the main body, and the second shaft member comprises a second shaft, a second shaft supporter having a first part rotatably and frictionally connected to the second shaft and a second part connected to the main body, and a second shaft coupling part extended from the second shaft toward the coupler and integrally coupled to the coupler.

According to an aspect of the invention, the display hinge may comprise a first shaft member having a first shaft, and a first shaft supporter frictionally and rotatably connected to the first shaft and connected to the first end of the link; and a first shaft supporting bracket connected to the display part and integrally connected to the first shaft.

According to a further aspect of the invention, the link may comprise an outer cover forming an outer appearance, and an inner cover coupled to the outer cover to form a cable accommodating space to accommodate a cable electrically connecting the display part with the main body, and the first shaft member and the second shaft member may be respectively formed with a first cable through hole and a second cable through hole to allow the cable pass therethrough.

According to still another aspect of the invention, the main hinge may be provided between the second end of each link and a rear upper part of the main body.

According to an additional aspect of the invention, the portable computer may further comprise at least one magnet provided on an upper surface of the main body; and an attaching part provided on at least one of a front and a back of the display part and magnetically attached to the magnet.

BRIEF DESCRIPTION OF THE DRAWINGS

These and other aspects and advantages of the present invention will become apparent and more readily appreciated from the following description of embodiments thereof, taken in conjunction with the accompany drawings of which.

Throughout the drawing figures, it should be understood that like reference numerals refer to like features and structures.

DETAILED DESCRIPTION OF THE PREFERRED EMBODIMENTS

Figure 1:
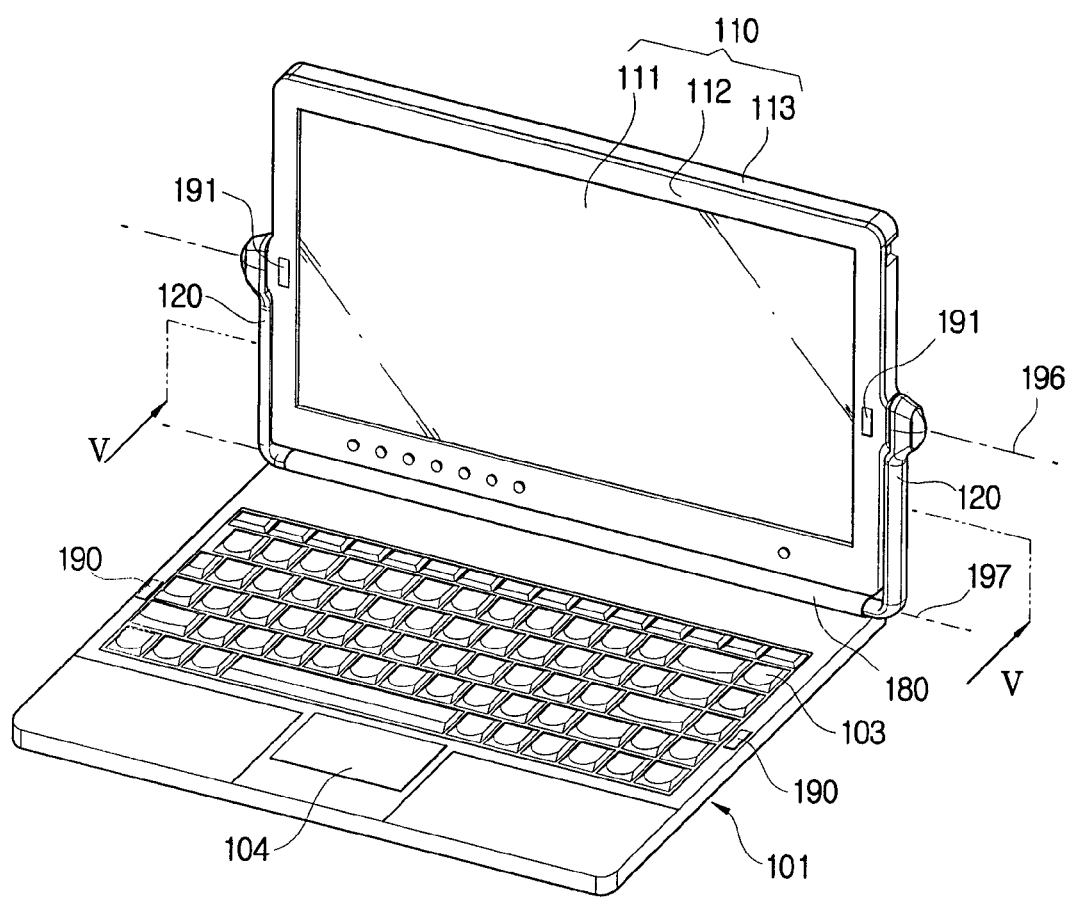
FIG. 1 is a front perspective view of a portable computer according to an embodiment of the present invention.
Figure 2:
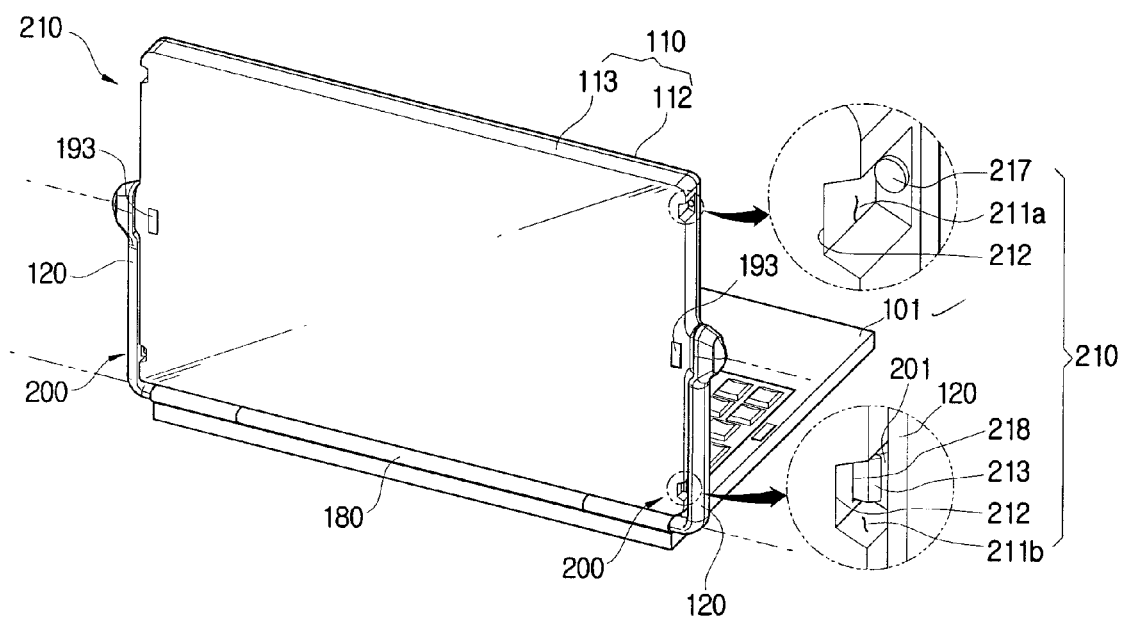
FIGS. 2 and 3 are rear perspective views of the portable computer of FIG. 1.
Figure 3:
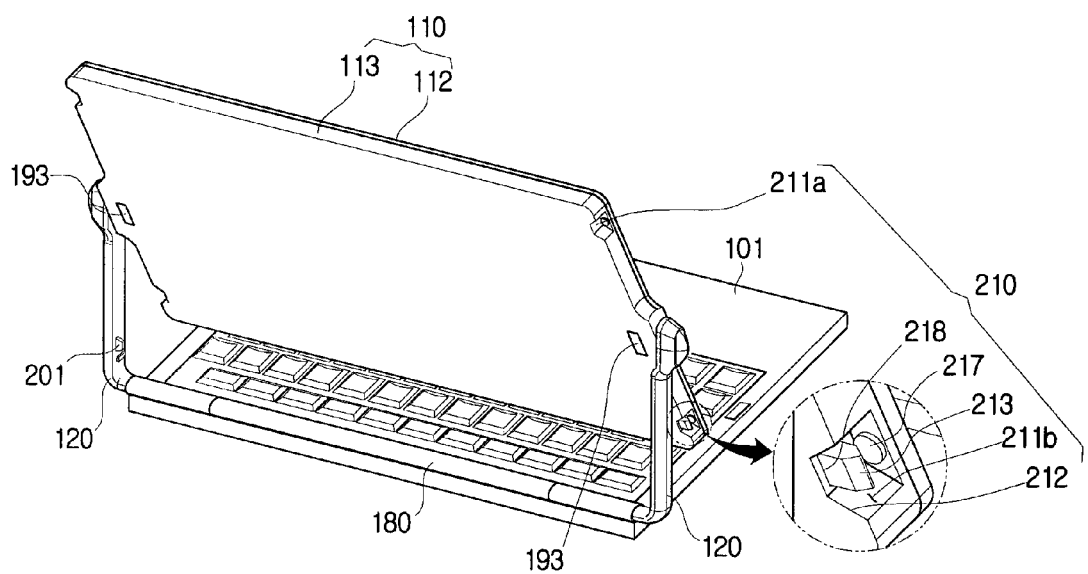
Figure 4:
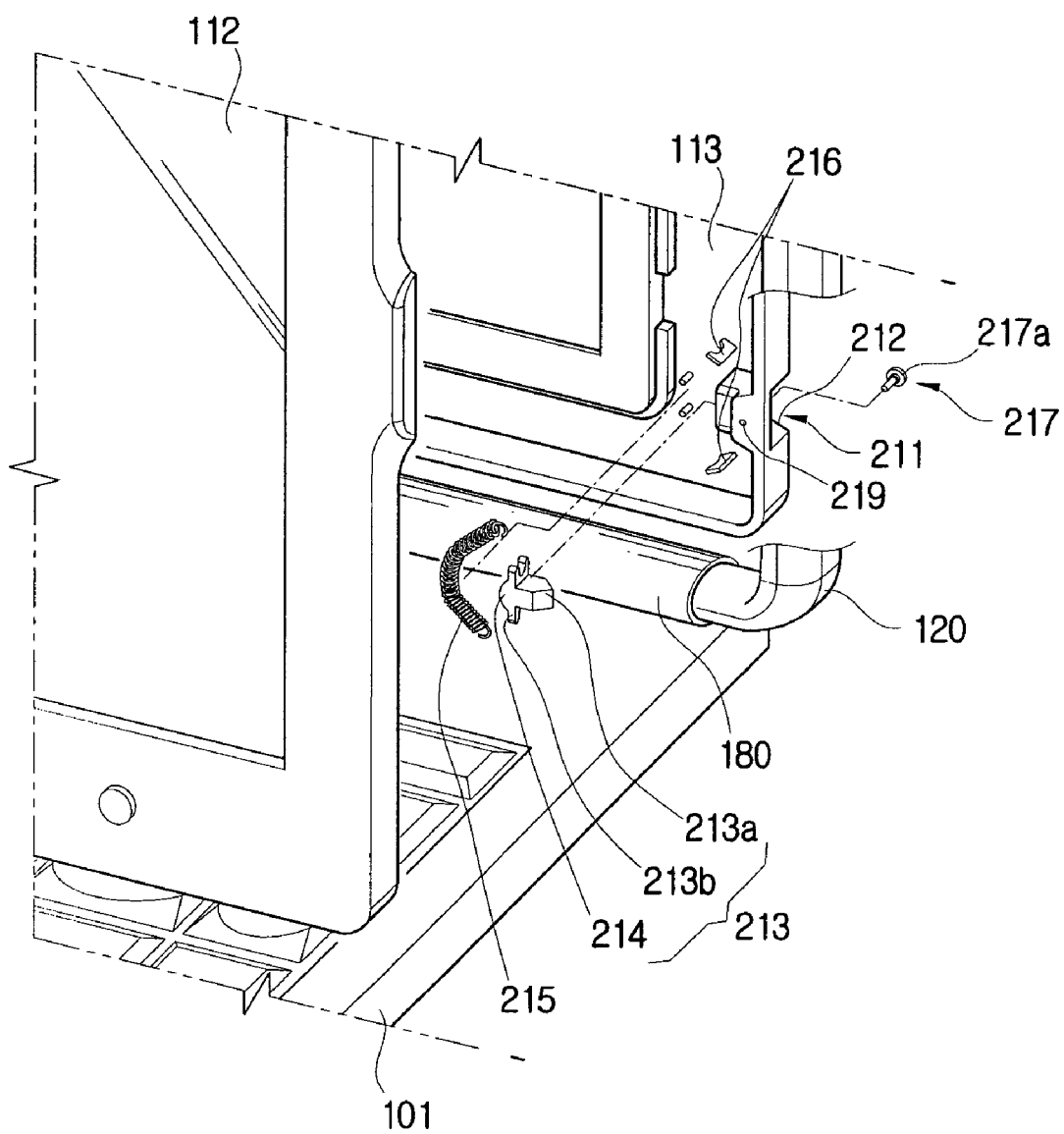
FIG. 4 is a partially exploded perspective view of a display part in the portable computer according to an embodiment of the present invention.
Figure 5:
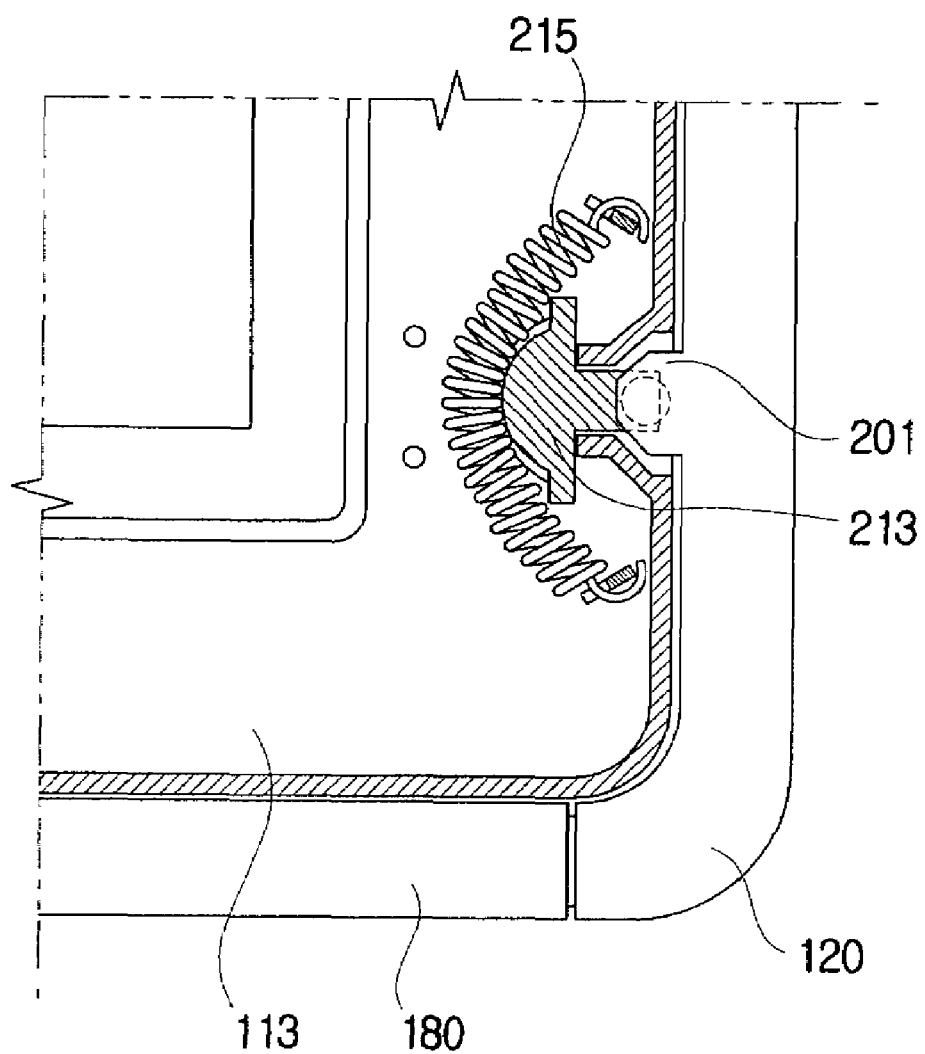
FIGS. 5 through 7 are sectional views illustrating operations of a locking unit in the portable computer according to an embodiment of the present invention.
Figure 6:
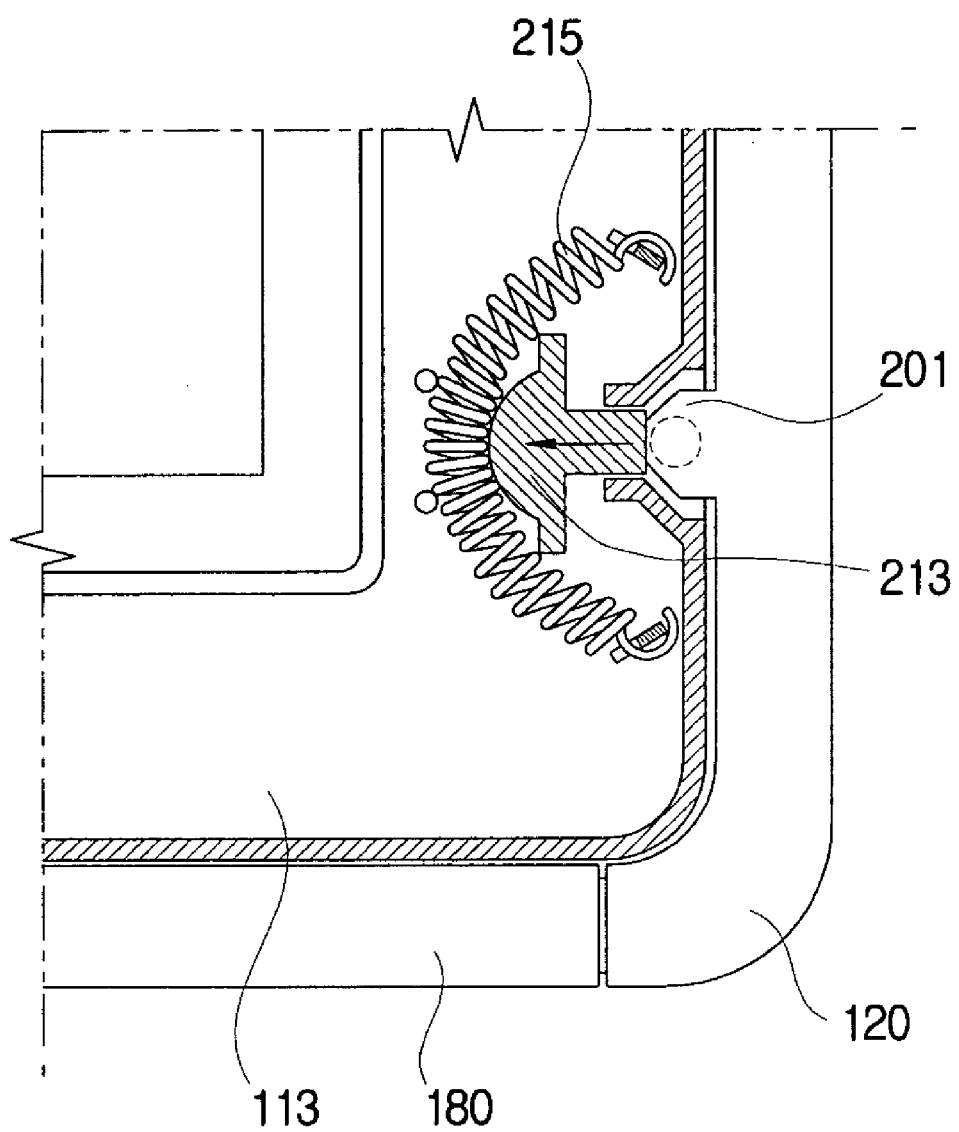
Figure 7:
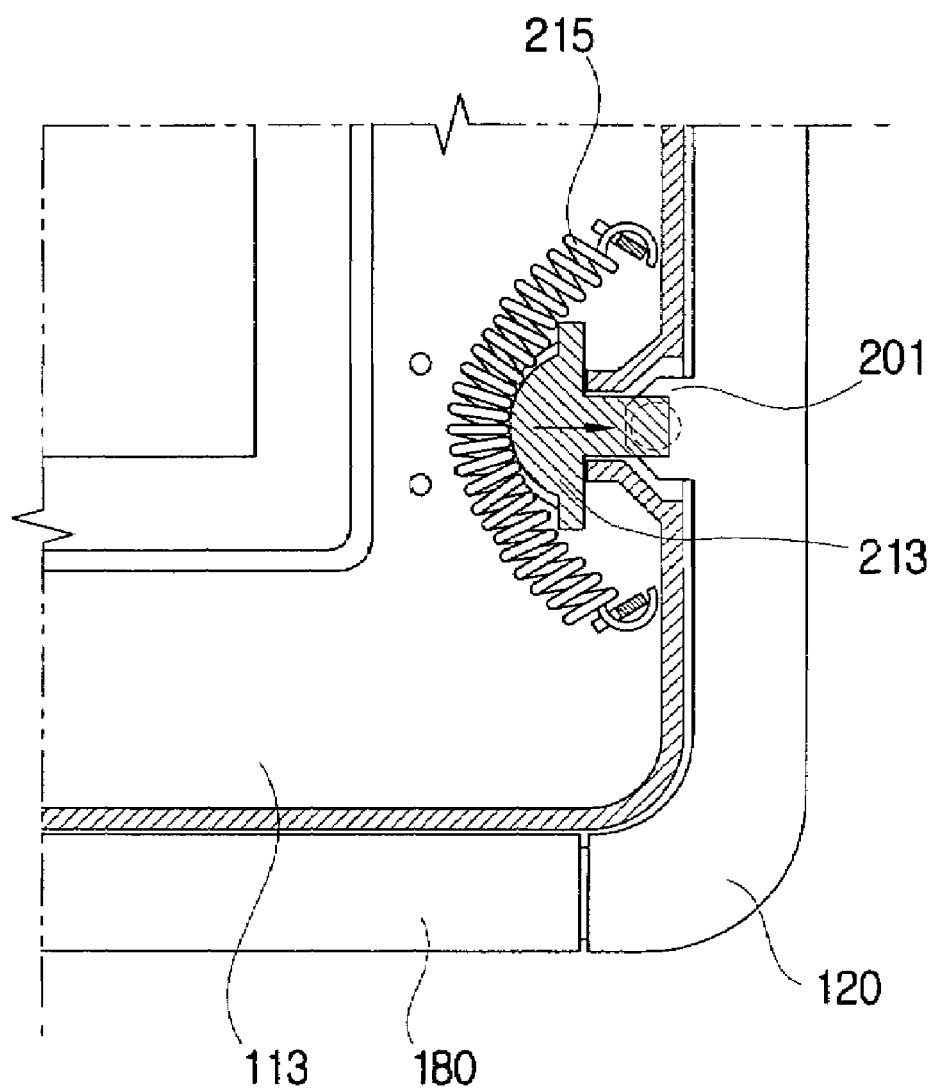

Reference will now be made in detail to the embodiments of the present invention, examples of which are illustrated in the accompanying drawings.

As shown in FIGS. 1 through 4, a portable computer according to an embodiment of the present invention comprises a main body 101 mounted with a plurality of hardware components; a display part 110 for displaying a picture based on a video signal received from the main body 101; a pair of links 120 each having a first end hingedly connected to the main body 101 and a second end hingedly connected to the display part 110 (see FIG. 4); a display hinge provided between the first end of each link 120 and the display part 110 and pivotally supporting the display part 110 to allow the display part 110 to tilt relative to the pair of links 120; a main hinge provided between the second end of each link 120 and the main body 101 and pivotally supporting the pair of links 120 to allow the pair of links 120 to pivot relative to the main body 101; and a locking unit 200 provided in the link 120 and the display part 110 to lock and release the tilt of the display part 110 relative to the link member 120. The portable computer according to an embodiment of the present invention further comprises a coupler 180 coupled to the main hinge and adapted to rotate relative to the main body 101 integrally with the links 120, wherein a rotating axis of the coupler 180 is aligned with a pivoting axis of the link 120.

The main body 101 comprises a main board (not shown) mounted with a central processing unit (CPU), a graphic chip, etc. thereinside, and an input unit such as a keyboard 103, a touch pad 104, etc. thereoutside. The main body 101 is electrically connected to the display part 110 by a cable 107 and transmits/receives a predetermined signal to/from the display part 110 through the cable 107. Preferably, the cable 107 comprises a first cable through which a digital signal and a power signal are transmitted, and a second cable through which an antenna signal and a switch signal are transmitted.

Between the main body 101 and the display part 110 is provided a holding part to prevent the display part 110 from being unintentionally opened relative to the main body 101 when the display part 110 is folded onto the main body 101. Preferably, the holding part comprises at least one magnet 190 provided on an upper surface of the main body 101, and attaching parts 191 and 193 provided on at least one of a front cover 112 and a rear cover 113 of the display part 110 and to which the magnets 190 are attached magnetically. However, the holding part may comprise a hook (not shown) provided in at least one of the main body 101 and the display part 110, and a hook holder (not shown) provided in the other one of the main body 101 and the display part 110 and releasably engaged with the hook.

Preferably, a pair of magnets 190 are provided on the upper surface of the main body 101 at left and right sides. Further, a pair of attaching parts 191 and 193 are preferably provided on the front cover 112 and rear cover 113 of the display part 110 respectively, so that the magnets 190 can magnetically attach to the attaching parts 191 and 193. Here, the attaching parts 191 and 193 are preferably made of a magnetizable material to be attached to the magnet 190.

The display part 110 utilizes a touch-screen technology, so that the display part 110 permit tablet operation with a stylus pen. The display part 110 comprises a liquid crystal display (LCD) panel 111 for displaying a picture based on the video signal received from the main body 101, and the front and rear covers 112 and 113 connected to each other across the LCD panel 111 and supporting the LCD panel 111 at front and rear sides.

The front cover 112 is provided with a first attaching part 191 for attachment to the magnet 190 of the main body 101 at a closed position allowing the front cover 112 to be in contact with the upper surface of the main body 101. Further, the rear cover 113 is provided with a second attaching part 193 to be attached to the magnet 190 of the main body 101 at a tablet position allowing the rear cover 113 to be in contact with the upper surface of the main body 101.

The coupler 180 is aligned with a second hinge axis 197 (to be described later), and couples the pair of links 120 to each other. That is, the coupler 180 supports the pair of links 120 to be pivoted relative to the main body 101 at the same time when the display part 110 tilts relative to the main body 101. Further, the coupler 180 is placed in a rear upper part of the main body 101, so that the portable computer can have a slim structure. The coupler 180 is preferably shaped like a pipe having a circular section to be resistant to torsion. However, the coupler 180 may have a polygonal section such as a rectangular section.

Figure 8:
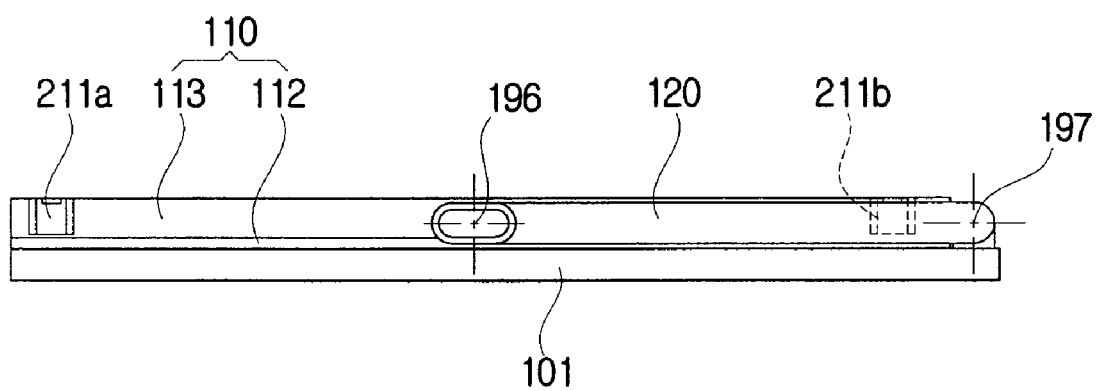
FIGS. 8 through 11 are side views illustrating tilts of the display part in the portable computer according to an embodiment of the present invention.
Figure 11:
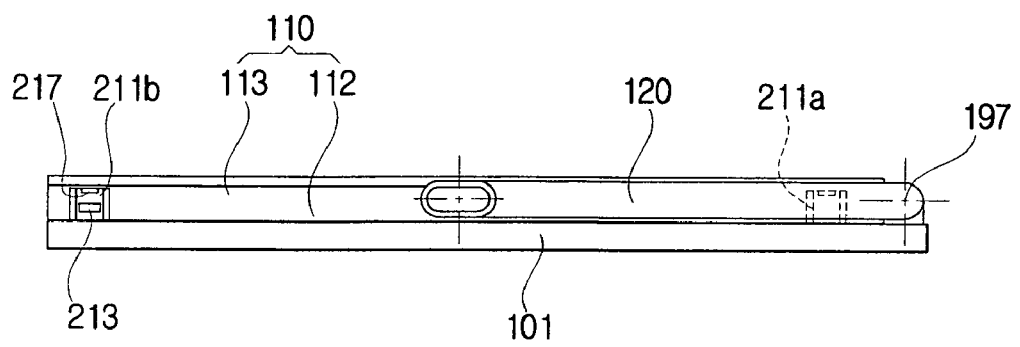
Figure 12:
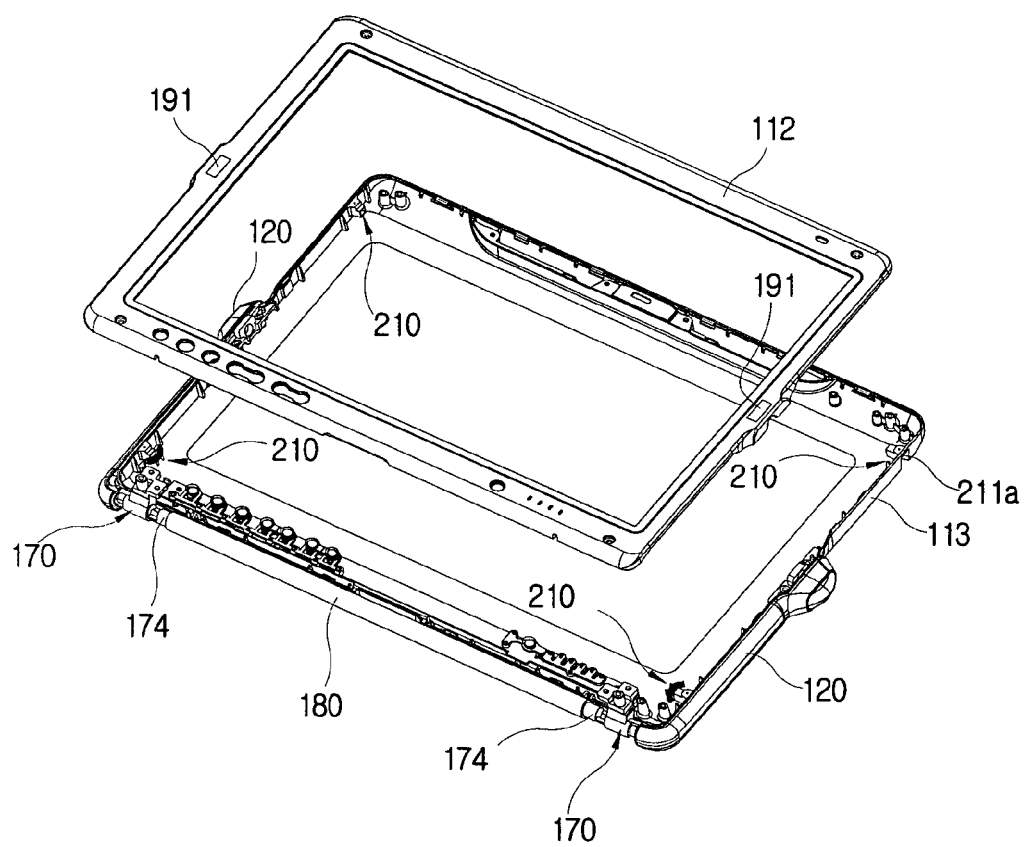
FIGS. 12 through 14 are exploded perspective views of the display part and a link in the portable computer according to an embodiment of the present invention.
Figure 13:
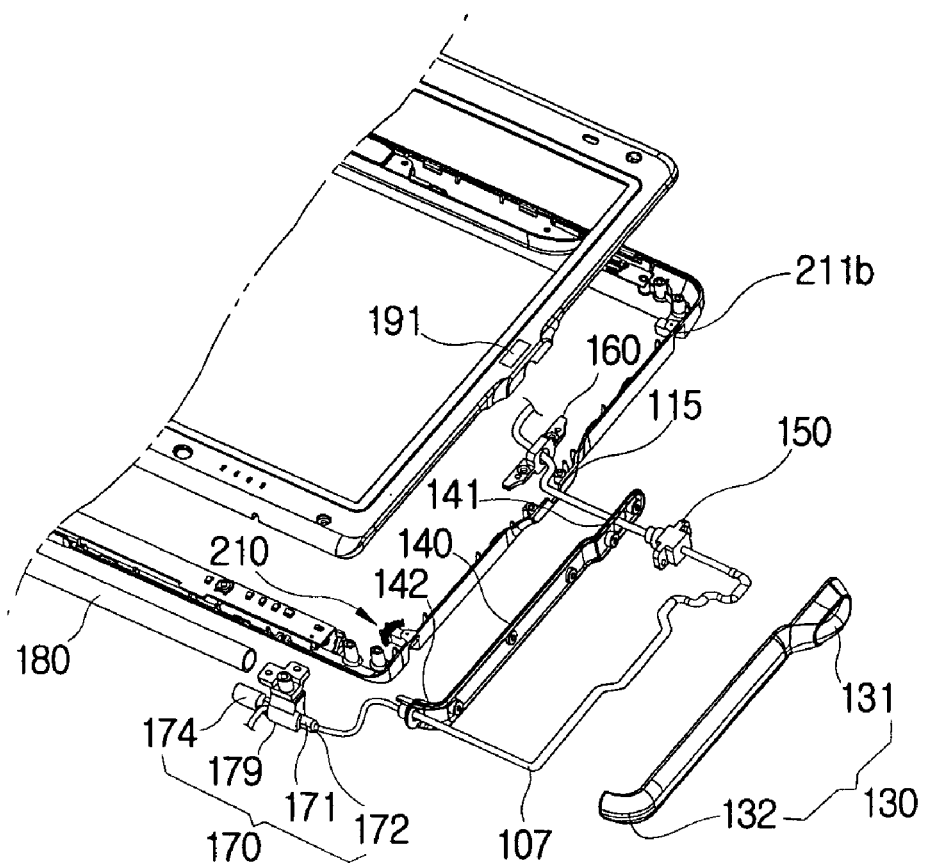
Figure 14:
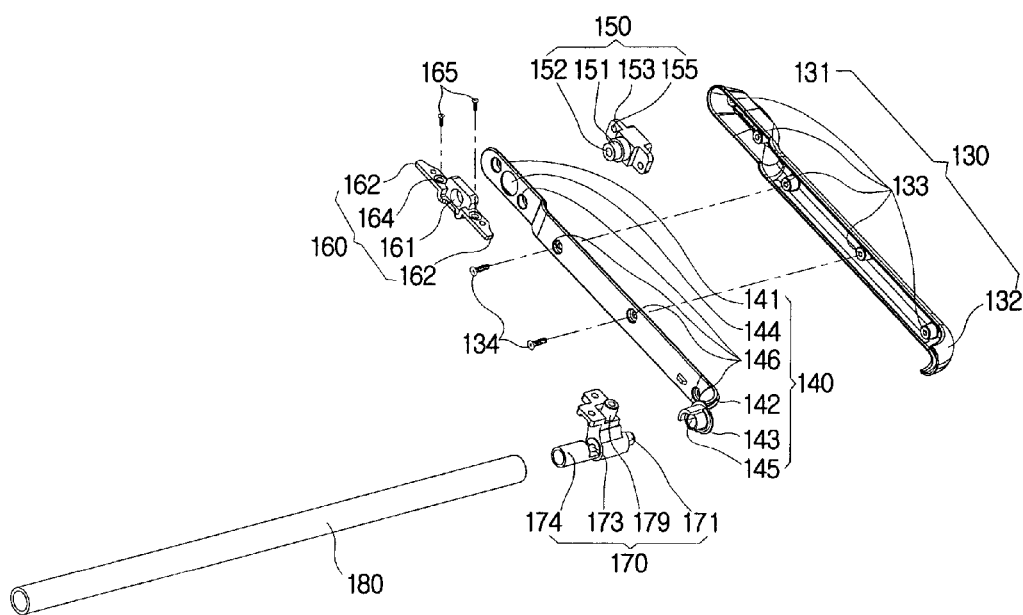

As shown in FIGS. 12 through 14, the links 120 are parallel to each other and disposed at opposite sides of the display part 110. Further, the links 120 tiltably connect the display part 110 to the main body 101, so that the display part 110 can tilt among the closed position (refer to FIG. 8) that the front cover 112 is in contact with the upper surface of the main body 101, an opened position (refer to FIGS. 9 and 10) that the display part 110 is opened relative to the main body, and the tablet position (refer to FIG. 11) that the rear cover 113 is in contact with the upper surface of the main body 101. Here, each link 120 comprises an outer cover 130 forming an outer appearance, and an inner cover 140 coupled to the outer cover 130 to form a cable accommodating space.

The outer cover 130 has a first end 131 being bent outward, and a second end 132 being bent inward. Further, the outer cover 130 is provided with thereinside a plurality of bosses 133 to be fastened with coupling holes 146 of the inner cover 140 by first screws 134.

The inner cover 140 has a first end 141 being bent outward corresponding to the first end 131 of the outer cover 130, and a second end 142 being bent inward corresponding to the second end 132 of the outer cover 130. Further, the first end 141 of the inner cover 140 is formed with a first hinge hole 144 to which a first shaft 151 of the first shaft member 150 is rotatably inserted. Further, the second end 142 of the inner cover 140 is formed with an extended part 143 having a second hinge hole 145 to which a second hinge shaft 171 of a second shaft member 170 is rotatably inserted. Further, the inner cover 140 is formed with the plurality of coupling holes 146 corresponding to the plurality of bosses 133 of the outer cover 130 and fastened with the bosses 133 by the first screws 134.

The display hinge is provided between the display part 110 and the link 120 and allows the display part 110 to tilt relative to the link 120. Further, the display hinge comprises the first hinge hole 144 of the inner cover 40, the first shaft member 150 having the first shaft 151 to be rotatably inserted in the first hinge hole 144, and a first shaft supporting bracket 160 connected to the rear cover 113 and supporting the first shaft 151 rotatably inserted in the first hinge hole 144.

The first shaft member 150 comprises a first shaft supporter 155 disposed between the first end 141 of the inner cover 140 and the first end 131 of the outer cover 130, the first shaft 151 being rotatably connected to the first shaft supporter 155 and protruding toward the rear cover 113, a first cable through hole 152 formed in the first shaft member 150 along a lengthwise direction of the first shaft 151 to allow the cable 107 to pass therethrough, and a pair of connection part 153 extended from opposite sides of the first shaft supporter 155 and connected to the first end 141 of the inner cover 140 and the first end 131 of the outer cover 130 by screws.

The first shaft 151 has a first end rotatably and frictionally connected to the first shaft supporter 155, and a second end which is forcibly fitted in a first shaft hole 161 of the first shaft supporting bracket 160 connected to the display part 110 and rotates integrally with the first shaft supporting bracket 160. That is, the first end of the first shaft 151 is rotatably and frictionally fitted to the first shaft supporter 155, and therefore a force large enough to overcome a predetermined friction is needed to tilt the display part 110 relative to the link 120. Preferably, such predetermined friction is large enough to prevent the display part 110 from tilting relative to the link 120 by the weight of the display part 110 and to allow a user to easily tilt the display part 110 relative to the link 120. Thus, the display part 110 can tilt about a first hinge axis 196 (see FIG. 10) formed by the first shaft 151.

The first shaft supporting bracket 160 comprises the first shaft hole 161 to which the second end of the first shaft 151 is forcibly and integrally fitted, and a pair of wings 162 protruding from opposite sides of the first shaft supporting bracket 160. Each. wing 162 is formed with a screw through hole 164 to be fastened to a fastening part 115 of the rear cover 113 by a second screw 165.

The main hinge is provided between the link 120 and the main body 101 and allows the link 120 to pivot relative to the main body 101. Further, the main hinge comprises the second hinge hole 145 formed in the extended part 143 of the inner cover 140, and the second shaft member 170 provided between an end of the coupler 180 and the extended part 143 of the inner cover 140.

The second shaft member 170 comprises the second shaft 171 forcibly fitted in the second hinge hole 145 of the inner cover 140 and rotating integrally with the inner cover 140, a second shaft supporter 179 rotatably and frictionally supporting the second shaft 171, and a second shaft coupling part 174 extended from the second shaft 171 toward the coupler 180 and integrally coupled to the coupler 180.

The second shaft supporter 179 has a first end rotatably connected to the second shaft 171, and a second end connected to the main body by a screw or the like.

The second shaft 171 is forcibly fitted in the second hinge hole 145 formed in the extended part 143 of the inner cover 140. The second shaft 171 is rotatably and frictionally connected to the second shaft supporter 179. That is, the second shaft 171 is rotatably and frictionally fitted to the second shaft supporter 179. Therefore a force large enough to overcome a predetermined friction is needed to pivot the link 120 relative to the main body 101. Such a predetermined friction is used for a purpose similar to the friction between the first shaft 151 and the first shaft supporter 155, and therefore a detailed description thereof will be omitted. Further, the second shaft 171 is formed with a second cable through hole 172 communicating with the cable accommodating space between the inner cover 140 and the outer cover 130. Thus, the cable 107 passes through the first cable through hole 172 of the first shaft 151, the cable accommodating space of the link 120, the second cable through hole 172 of the second shaft 171 in sequence. Further, the second shaft 171 is forcibly and integrally fitted in the second hinge hole 145, and rotatably and frictionally inserted in the second shaft supporter 179, thereby allowing the display part 110 to tilt about the second shaft 171. Thus, the display part 110 can tilt about the second hinge axis 197 formed by the second shaft 171.

Here, the second hinge axis 197 is in parallel with and spaced from the first hinge axis 196, and is aligned with the coupler 180. That is, when the display part 110 is tilted about the second hinge axis 197 of the second shaft 171 of the main hinge, the coupler 180 is aligned with the second hinge axis 197. The coupler 180 is coupled to the second shaft coupling part 174 extended from the second shaft 171 and rotates integrally with the second shaft 171.

The second shaft coupling part 174 extends from the second shaft 171 toward the coupler 180, and is coupled to the end of the coupler 180 shaped like a pipe. Preferably, the second shaft coupling parts 174 are forcibly fitted to the opposite ends of the coupler 180 so as to rotate integrally with the second shaft 171. However, the second shaft coupling part 174 may be coupled to the coupler 180 by a screw or the like. Further, between the second shaft coupling part 174 and the second shaft 171 is formed a bypassing opening 173 being cut to communicate with the second cable through hole 172 of the second shaft 171. Thus, the cable 107 passing through the second cable through hole 172 is connected to the main body 101 through the bypassing opening 173.

The locking unit 200 comprises a locking projection 201 protruding from one of the link 120 and the display part 110 toward the other one, and a projection holder 210 provided in the other one and elastically locked to and released from the locking projection 201.

The locking projection 201 is provided in the pair of links 120, respectively. However, the locking projection 201 may be provided in at least one of the pair of links 120. Preferably, the locking projection 201 protrudes from the inner cover 140 of the link 120 toward the display part 110. More preferably, the locking projection 201 is placed adjacent to the second end of the link 120 connected to the main hinge. According to an embodiment of the present invention, the locking projection 201 has a rectangular shape, but may have a polygonal shape, an arc shape, etc.

Preferably, the projection holder 210 is placed in a lateral side of the display part 110, corresponding to the locking projection 201. Further, the projection holder 210 comprises a projection accommodating part 211 formed in the lateral side of the display part 110 to allow the display part 110 tilted relative to the link 120 to accommodate the locking projection 201, and a holding projection 213 elastically retracted in the projection accommodating part 211 by contacting the locking projection 201. Further, the projection holder 210 comprises a spring 215 elastically pushing the holding projection 213 toward the outside of the display part 110.

The projection accommodating part 211 comprises an opening 212 opened in the back of the display part 110, and an elastic member 217 facing opposite the opening 212 and contacting the locking projection 201 past the holding projection 213 so as to prevent noise from coming out. Further, the projection accommodating part 211 is provided symmetrically with respect to the first hinge axis 196, forming a pair. That is, referring to FIG. 2, the projection accommodating part 211 comprises a pair of first projection accommodating parts 211a located in upper opposite sides of the display part 110, and a pair of second projection accommodating parts 211b located in lower opposite sides of the display part 110. Further, the projection accommodating part 211 is provided with a holding projection through part 218 through which a first part 213a of the holding projection 213 is exposed toward the locking projection 201. Here, the projection accommodating part 211 is preferably provided in the rear cover 113 of the display part 110 to accommodate the locking projection 201, but may be provided in the front cover 112.

Preferably, the first end 213a of the holding projection 213 is smaller than the holding projection through part 218 so as to pass through the holding projection through part 218, and has a wedge-shape to easily contact the locking projection 201. Further, a second end 213b of the holding projection 213 is larger than the holding projection through part 218 so as to not pass through the holding projection through part 218, and has a spring contact part 214 grooved to easily contact the spring 215.

The spring 215 is coupled to the display part 110, being in contact with the second end 213b of the holding projection 213 and elastically pushing the holding projection 213 outward from the display part 110. Preferably, the spring 215 is coupled to the rear cover 113 of the display part 110 and contacts the spring contact part 214, and the rear cover 113 is provided with a spring supporter 116 to support opposite ends of the spring 215. Further, the spring 215 is preferably a coil spring, but may be made of an elastic material such as a flat spring, a rubber material, etc. In this embodiment, the holding projection 213 and the spring 215 are provided in only the second projection accommodating parts 211b, but may be provided in only the first projection accommodating part 211a or both the first and second projection accommodating parts 211a and 211b.

The elastic member 217 is preferably provided in both the first and second projection accommodating parts 211a and 211b. Further, the elastic member 217 is preferably placed in the projection accommodating part 211, facing opposite the opening 212. Here, the elastic member 217 contacts the locking projection 201 elastically past the holding projection 213, and prevents the locking projection 201 from moving. Preferably, the elastic member 217 is made of a rubber material. Further, the elastic member 217 is provided with an insertion part 217a to be elastically inserted and connected into an insertion hole 219 of the projection accommodating part 211 facing opposite to the opening 212. However, the elastic member 217 may be a spring which contacts the locking projection 201 and prevent the noise from coming out.

Operations of the locking unit 200 will now be described with reference to FIGS. 5 through 11.

First, the display part 110 and the link 120 are rotated with respect to the second hinge axis 197, and changed from the closed position (refer to FIG. 8) in which the front cover 112 is in contact with the upper surface of the main body 101 to the opened position (refer to FIG. 9) in which the display part 110 is opened relative to the main body 101. The locking projection 201 of the link 120 is accommodated in the second projection accommodating part 211b of the projection holder 210 provided in the display part 110 and rotates integrally with the display part 110. That is, when the display part 110 is upwardly pushed and tilted from the closed position (refer to FIG. 8) to the opened position (refer to FIG. 9), the locking projection 201 is in contact with the holding projection 213 and the elastic member 217 of the second projection accommodating part 211b, so that the display part 110 does not rotate relative to the link 120. Therefore, even if a user pushes only the display part 110 downward, the link 120 rotates integrally with the display part 110, so that it is convenient for the user. Further, even if the user pushes only the display part 110, the display part 110 does not freely rotate relative to the link 120, thereby preventing the display part 110 from an unintentional collision with the main body 101.

Figure 9:
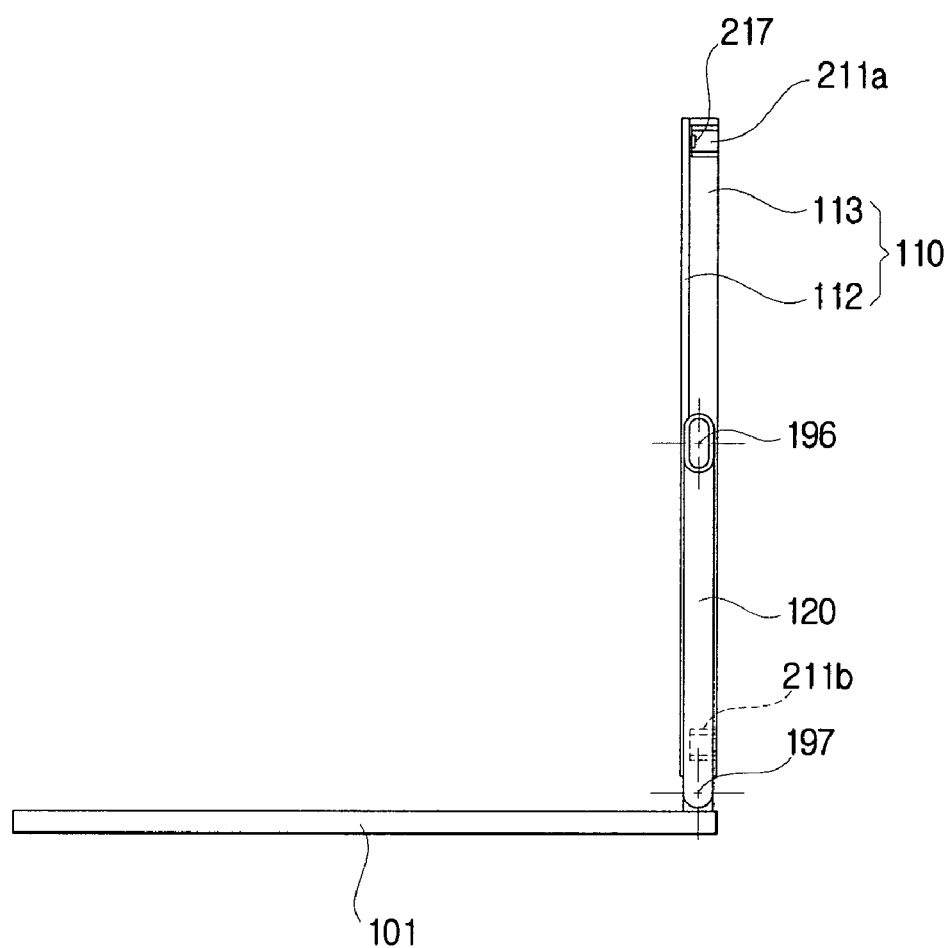
Figure 10:
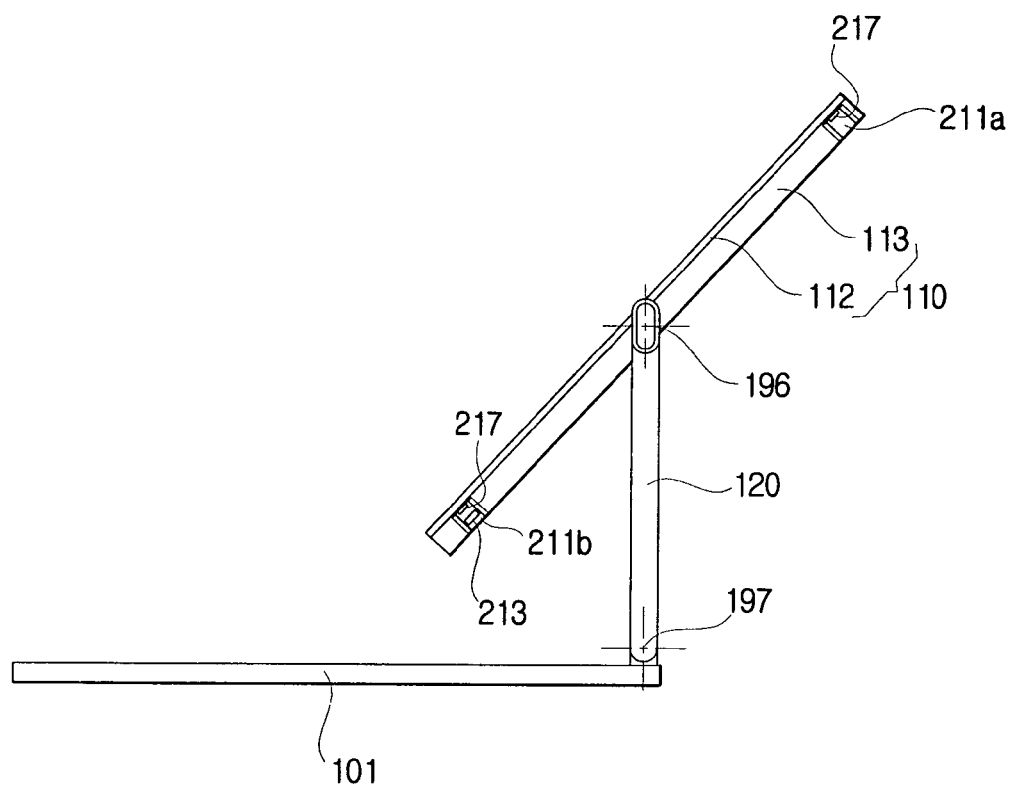

The display part 110 can be tilted further from the opened position shown in FIG. 9, that is, a lower part of the display part 110 can be tilted forward relative to the link 120 (refer to FIG. 10). A user has to push the display part 110 with enough force to allow the locking projection 201 accommodated in the second projection accommodating part 211b to be elastically pushed by the holding projection 213. Thus, the locking projection 201 moves from a locked position (refer to FIG. 5), in which the locking projection 201 is accommodated in the second projection accommodating part 211b and locked by the holding projection 213, to a released position (refer to FIG. 7), in which the locking projection 201 is released from the second projection accommodating part 211b, via a pushing position (refer to FIG. 6), in which the locking projection 201 is elastically pushing the holding projection 213.

The display part 110 can be tilted further relative to the link 120 from the position shown in FIG. 10 until the locking projection 201 is accommodated in the first projection accommodating part 211a. Then, the display part 110 and the link 120 can be integrally tilted relative to the main body 101 and changed to the tablet position (refer to FIG. 11) in which the rear cover 113 of the display part 110 is in contact with the upper surface of the main body 101. At this time, the locking projection 201 of the link 120 is accommodated in and pivoted integrally with the first projection accommodating part 211a of the display part 110. That is, when the display part 110 is downwardly pushed and tilted to the tablet position (refer to FIG. 11), the locking projection 201 is in contact with the elastic member 217 of the first projection accommodating part 211a, so that the display part 110 does not rotate relative to the link 120. Therefore, even if a user pushes only the display part 110 downward, the link 120 rotates integrally with the display part 110, so that it is convenient for the user. Further, even if the user pushes only the display part 110, the display part 110 does not freely rotate relative to the link 120, thereby preventing the display part 110 from an unwanted collision with the main body 101.

On the other hand, a process of tilting the display part 110 from the tablet position (refer to FIG. 11) to the closed position (refer to FIG. 8) is performed in a reverse order of the described operations.

Additionally, the portable computer according to the illustrated embodiment of the present invention further comprises the coupler 180 coupled to the main hinge and rotating relative to the main body 101 integrally with the links 120, wherein the rotating axis of the coupler 180 is aligned with the pivoting axis of the link 120. Therefore, the coupler 180 prevents the torsion from being generated when the pair of second shaft members 170 may be individually rotated, so that the display part 110 is stably tilted and prevented from being a problem. For example, while the display part 110 is tilted relative to the main body 101, if the pair of second shaft members 170 are not simultaneously rotated, the display part 110 is distorted and is not smoothly and stably tilted and the LCD panel 111 may be distorted, thereby causing a problem in the display part 110.

In the foregoing embodiment, the first shaft 151 is forcibly fitted in a first shaft hole 161 of the first shaft supporting bracket 160 and rotates integrally with the first shaft supporting bracket 160, and the second shaft 171 is forcibly fitted in the second hinge hole 145 formed in the extended part 143 of the inner cover 140 and rotates integrally with the inner cover 140. However, the first shaft 151 and the second shaft 171 may have noncircular sections and be integrally fitted to the first shaft hole 161 and the second hinge hole 145, respectively.

As described above, the illustrated embodiments of the present invention provide a portable computer having an improved structure for convenience and stability when a display part is tilted.

Further, the illustrated embodiments of the present invention provide a portable computer comprising a coupler coupled to a main hinge and aligned with an axis of the main hinge, so that the display part is stably tilted and prevented from torsion and being a problem.

Although only a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A portable computer comprising a main body, and a display part connected to the main body, further comprising:
    a pair of links connecting the display part with the main body;
    a display hinge provided between a first end of each link and the display part and pivotally supporting the display part to allow the display part to tilt relative to the pair of links;
    a main hinge provided between a second end of each link and the main body and pivotally supporting the pair of links to allow the pair of links to pivot relative to the main body; and
    a locking unit provided in the display part and at least one of the pair of links to lock and release the tilt of the display part relative to the link member.

2. The portable computer according to claim 1, wherein the pair of links are parallel to each other and disposed at opposite sides of the display part.

3. The portable computer according to claim 2, wherein the locking unit comprises:
    a locking projection protruding from one of the display part and at least one of the pair of links; and
    a projection holder, provided in the remaining one of the display part and at least one of the pair of links, and elastically locked to and released from the locking projection.

4. The portable computer according to claim 3, wherein the locking projection is provided in at least one of the pair of links, and the projection holder is provided in the display part in relation to the locking projection.

5. The portable computer according to claim 4, wherein the projection holder comprises:
    a projection accommodating part formed in a lateral side of the display part to allow the display part tilted relative to the link to accommodate the locking projection; and
    a holding projection elastically retracted in the projection accommodating part by contacting the locking projection.

6. The portable computer according to claim 5, wherein the projection accommodating part comprises:
    an opening in a back of the display part to accommodate the locking projection; and
    an elastic member facing opposite the opening and contacting the locking projection past the holding projection so as to prevent noise from coming out.

7. The portable computer according to claim 6, wherein the locking projection is placed adjacent to the second end of the link connected to the main hinge, and
    the pair of projection accommodating parts are provided symmetrically with respect to an axis of the display hinge in relation to the locking projection, and selectively accommodate the locking projection.

8. The portable computer according to claim 7, wherein the projection holder comprises a spring elastically pushing the holding projection outwardly from the display part, and
    the holding projection and the spring are provided in at least one of the pair of projection accommodating parts.

9. The portable computer according to claim 2, further comprising a coupler coupled to the main hinge and rotating relative to the main body integrally with the links, wherein an axis of the coupler is aligned with an axis of the main hinge.

10. The portable computer according to claim 9, wherein the main hinge comprises a second shaft member provided in the second end of each link, the coupler and the main body, and the second shaft member comprises a second shaft, a second shaft supporter having a first part rotatably and frictionally connected to the second shaft and a second part connected to the main body, and a second shaft coupling part extended from the second shaft toward the coupler and integrally coupled to the coupler.

11. The portable computer according to claim 10, wherein the display hinge comprises:

a first shaft member having a first shaft, and a first shaft supporter frictionally and rotatably connected to the first shaft and connected to the first end of the link; and a first shaft supporting bracket connected to the display part and integrally connected to the first shaft.

12. The portable computer according to claim 11, wherein the link comprises an outer cover forming an outer appearance, and an inner cover coupled to the outer cover to form a cable accommodating space to accommodate a cable electrically connecting the display part with the main body, and the first shaft member and the second shaft member are respectively formed with a first cable through-hole and a second cable through-hole to allow the cable to pass therethrough.

13. The portable computer according to claim 1, wherein the main hinge is provided between the second end of each link and a rear upper part of the main body.

14. The portable computer according to claim 1, further comprising:

at least one magnet provided on an upper surface of the main body; and an attaching part provided on at least one of a front and a back of the display part and magnetically attached to the magnet.

* * * * *